United States Patent
Bey et al.

(10) Patent No.: US 8,312,893 B2
(45) Date of Patent: Nov. 20, 2012

(54) AXIAL DRAG VALVE WITH INTERNAL HUB ACTUATOR

(75) Inventors: Roger Bey, Rossignols (FR); Samuel C. Sturtevant, Mission Viejo, CA (US); Sina Alikhani, Laguna Hills, CA (US); Daniel McMillen, Fullerton, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 517 days.

(21) Appl. No.: 12/114,176

(22) Filed: May 2, 2008

(65) Prior Publication Data

US 2009/0272929 A1 Nov. 5, 2009

(51) Int. Cl.
F16K 1/12 (2006.01)

(52) U.S. Cl. ............ 137/625.38; 251/325; 251/344

(58) Field of Classification Search ............ 251/324, 251/325, 343, 344, 345; 137/625.38
See application file for complete search history.

(56) References Cited

U.S. PATENT DOCUMENTS

| | | | |
|---|---|---|---|
| 3,964,516 A * | 6/1976 | Purton et al. | 137/625.38 |
| 3,990,475 A * | 11/1976 | Myers | 137/625.3 |
| 4,167,262 A * | 9/1979 | Lemmon | 251/25 |
| 4,398,563 A * | 8/1983 | Kay et al. | 138/42 |
| 4,444,220 A | 4/1984 | Seger | |
| 4,567,915 A * | 2/1986 | Bates et al. | 138/42 |
| 4,712,769 A * | 12/1987 | Johnson | 251/324 |
| 5,316,319 A * | 5/1994 | Suggs | 251/214 |
| 5,435,336 A | 7/1995 | Serot | |
| 5,448,962 A * | 9/1995 | Moody | 251/343 |
| 5,687,763 A | 11/1997 | Steinke | |
| 5,772,182 A * | 6/1998 | Stambaugh et al. | 251/325 |
| 5,964,248 A | 10/1999 | Enarson et al. | |
| 6,047,734 A * | 4/2000 | Robinson | 137/625.37 |
| 6,216,721 B1 | 4/2001 | Perez | |
| 6,568,717 B1 | 5/2003 | Le Cinche | |
| 6,684,897 B2 * | 2/2004 | Sundararajan | 137/15.19 |
| 6,733,000 B2 | 5/2004 | McCarty et al. | |
| 6,755,354 B2 | 6/2004 | Fukano et al. | |
| 6,817,416 B2 * | 11/2004 | Wilson et al. | 251/344 |
| 6,874,761 B2 | 4/2005 | McCarty et al. | |
| 6,923,428 B2 | 8/2005 | Quere et al. | |
| 6,926,032 B2 | 8/2005 | Nawaz | |

(Continued)

FOREIGN PATENT DOCUMENTS

DE 1172501 6/1964

(Continued)

OTHER PUBLICATIONS

Mokveld Valves Bv, "Axial Control Valve Product Summary Sheet," The Netherlands.

(Continued)

Primary Examiner — John Bastianelli
(74) Attorney, Agent, or Firm — Stetina Brunda Garred & Brucker (57) ABSTRACT

In accordance with the present invention, there is provided an axial drag control valve which includes an internal disk stack trim and an internal actuator. The fluid inlet and outlet of the valve are disclosed along a common axis, which is further shared with both the plug and the actuator. The plug and actuator move along this particular axis to control the fluid flow rate, pressure, or temperature of the system. The valve actuator may be powered by an operating fluid such as air supplied from an external source. A special, two-part packing with a lantern ring and leak-off port provides protection and safety for the actuator.

21 Claims, 8 Drawing Sheets

U.S. PATENT DOCUMENTS

| | | | |
|---|---|---|---|
| 6,929,245 | B2 | 8/2005 | McCarty et al. |
| 7,066,447 | B2 | 6/2006 | McCarty et al. |
| 7,178,785 | B2 | 2/2007 | McCarty et al. |
| 2002/0029813 | A1 | 3/2002 | Suto et al. |
| 2005/0072472 | A1 | 4/2005 | Horin |

FOREIGN PATENT DOCUMENTS

| | | |
|---|---|---|
| FR | 2130794 | 11/1972 |
| GB | 2198501 | 6/1988 |

OTHER PUBLICATIONS

Mokveld Valves Bv, "Axial Surge Relief Valve Product Summary Sheet," The Netherlands.
Dresser Flow Solutions, Becker Operations "Becker Series CV & 41005 Natural Gas Globe Valve Regulator," Elk Grove, Illinois, USA.
Dresser Flow Solutions, Becker Operations "RPDA Series Rotary Piston Double Acting Actuators," Elk Grove, Illinois, USA.
Maryland Metrics "Piloted Axial Valve," mdmetric.com.
SPX Process Equipment, "M&J Valve—The Danflo Family of Control Valves," Houston, Texas.
RMG, "Flow Control Valve RMG 530," Germany.
CMB Industries, "Baily PolyJet Valves," Fresno, California.
CMB Industries, "PolyJet Control Valves," Fresno, California.
Balluff, "Micropulse Ex TA12" www.balluff.com.
The Wolf Safety Lamp Company, Ltd., "Wolflite Handlamp," product label, England.
VDMA Valves, "ATEX Guidelines for the Valve Industry," Germany.
Kuhme Armaturen,"Axialventil Typ AX," Germany.
EU Written Opinion for PCT/US2008/086877.
US Written Opinion for PCT/US2008/086877.

* cited by examiner

AXIAL DRAG VALVE WITH INTERNAL HUB ACTUATOR

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates generally to control valves, and more particularly to an axial control valve product that provides high capacity and low noise performance characteristics.

2. Description of the Related Art

As is known in the control valve industry, three well known types of conventional fluid valves include rotary stem valves, sliding stem valves, and sleeve valves. Rotary stem valves generally comprise a rotary shaft or stem which is maintained within a valve body. The rotation of the shaft may be used to facilitate the alignment of a radial port of the shaft with a fluid port of the valve body to open a valve passage. Conversely, the rotation of the shaft may facilitate a misalignment of the ports to effectively close the valve passage. In operation, a typical rotary valve shaft or stem must rotate about 90° relative to the valve body between the fully open and closed positions. There exists in the prior art other types of rotary valve designs which utilize alternative geometries requiring a shaft rotation that is less than 90°, such as three way or angled ball valves.

Rotary valves typically employ the use of seals, and often bearings, which are disposed between the rotary shaft and the valve body to prevent fluid from leaking from the valve body between the shaft and the valve body. In this regard, one of the primary drawbacks of rotary valves is that the significant movement of the shaft typically causes substantial wear to the seals and, if present, the bearings. Thus, the bearings and seals of a rotary valve must typically be replaced over time. Another drawback is that the seals, in order to function properly, also add friction between the valve body and the shaft. Substantial force is therefore typically necessary to overcome the seal friction and rotate the shaft.

A sliding stem valve typically operates on a principle similar to a piston, and includes a valve plug on a stem that slides linearly within a valve body. The valve plug bears against a seat or closes a passage when moved to a closed position, and is spaced from the seat or clears the passage when moved to an open position. The valve stem and the valve plug must usually move relative to the valve body a significant distance between the fully open and closed positions. Like rotary stem valves, sliding stem valves typically employ seals, and often guides, between the stem and the valve body to prevent fluid from leaking from the valve body between the stem and the valve body. In this regard, one of the primary drawbacks of sliding stem valves is that the significant linear movement of the stem causes wear on the seals, thus often necessitating that the seals be replaced over time. Another drawback is that the seals also create friction that must be overcome in order to move the linear stem valve between its open and closed positions.

Sleeve valves typically have a valve body defining an axial fluid flow passage. A stationary valve plug is usually fixed within the valve passage and carries or defines a valve seat positioned on an upstream end of the plug. A slideable valve sleeve is positioned in the valve passage and can be selectively moved between a fully closed position with a downstream end of the sleeve bearing against the valve seat, and a fully opened position with the downstream end of the sleeve being spaced a prescribed distance from the valve seat. Fluid can flow through the valve passage and the sleeve, around the valve plug, and an exit outlet of the valve.

Sleeve valves as known in the prior art typically have a number of prescribed performance characteristics, such as fluid flow rate, fluid pressure, valve flow coefficient, as well as inherent, installed, and linear flow characteristics. Various flow characteristics of sleeve valves can typically be determined or controlled by a number of factors, including the size and shape or contour of the upstream end of the valve plug, the shape of the plug body beyond or downstream of the upstream end, and the passageway or orifice size and contour surrounding the valve plug. Other valve features can be designed and shaped to affect valve flow or performance characteristics as well, including contours of the valve sleeve outlet opening or the like. Along these lines, designing a particular valve plug shape is an often used means to achieve a desired valve performance or flow characteristic. However, as a result, a typical sleeve valve for a given system often has a unique, non-replaceable valve sleeve and plug. Thus, if a different valve flow characteristic is desired for a particular valve or system, or if a valve seat or plug is damaged within a valve or system, it is often necessary to remove and replace the entire valve assembly within the system. In this regard, to change the load characteristics or the valve plug, it has typically been necessary in the prior art to swap the entire sleeve valve with a newer replacement valve.

The axial drag valve constructed in accordance with the present invention is adapted to overcome many of the deficiencies highlighted above in relation to known rotary, sliding stem, and sleeve valve designs. Various novel features of the present invention will be discussed in more detail below.

BRIEF SUMMARY OF THE INVENTION

In accordance with the present invention, there is provided multiple embodiments of an axial drag control valve which includes an internal disk stack trim and an internal actuator. The fluid inlet and outlet of the valve are disposed along a common axis, which is further shared with both the actuator and a plug of the valve. The plug and actuator move along this particular axis to control the fluid flow rate, pressure, or temperature of the system. In certain embodiments of the present invention, the valve actuator may be powered by an operating fluid from an external source, exemplary operating fluids including seven (7) bar air or eighty (80) bar air. A special, two-part packing with a lantern ring and leak-off port provides protection and safety for the actuator.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein.

Common reference numerals are used throughout the drawings and detailed description to indicate like elements.

DETAILED DESCRIPTION OF THE INVENTION

Figure 1:
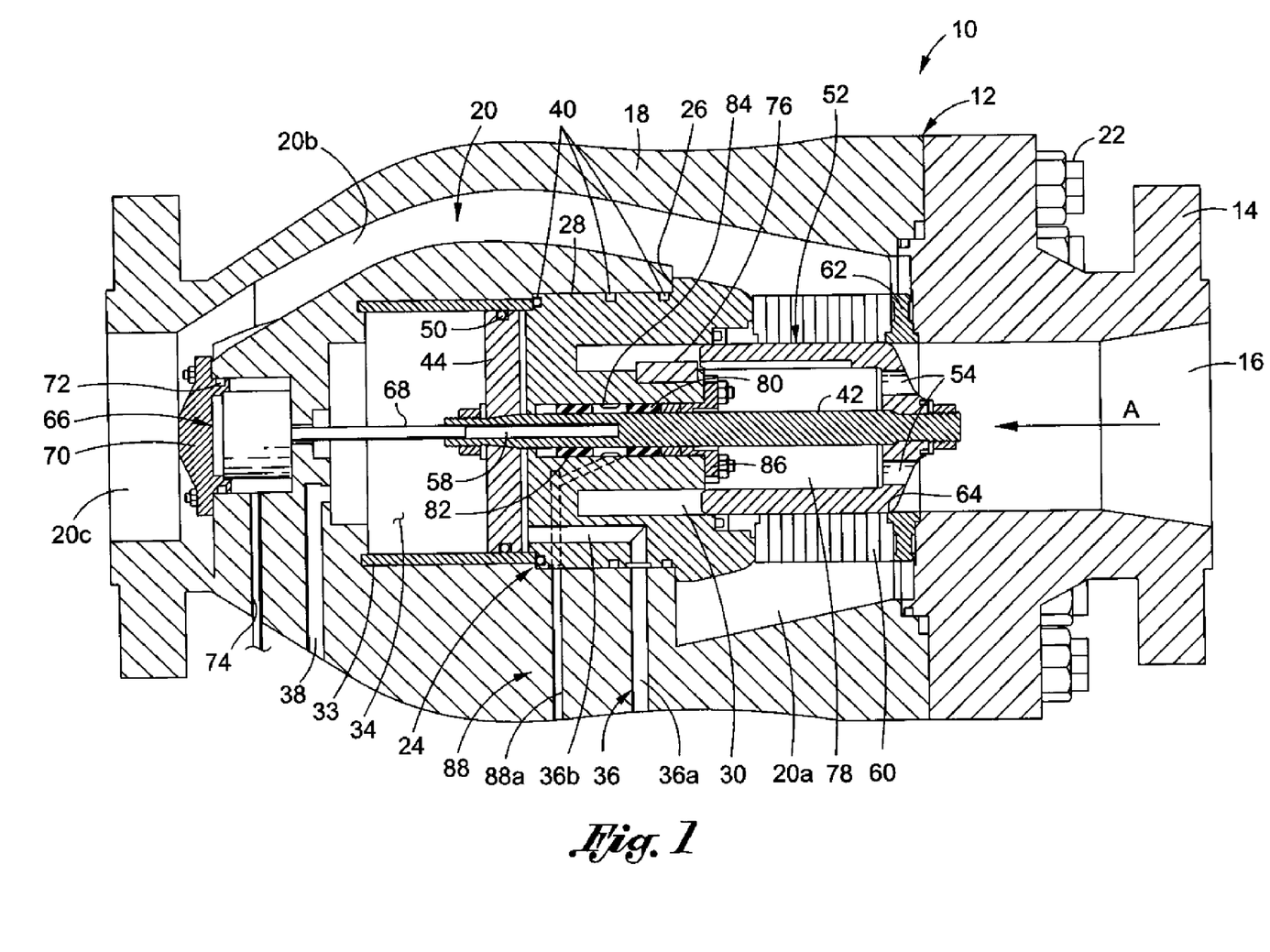
FIG. 1 is a cross-sectional view of an axial drag valve constructed in accordance with a first embodiment of the present invention as residing in its closed position.
Figure 2:
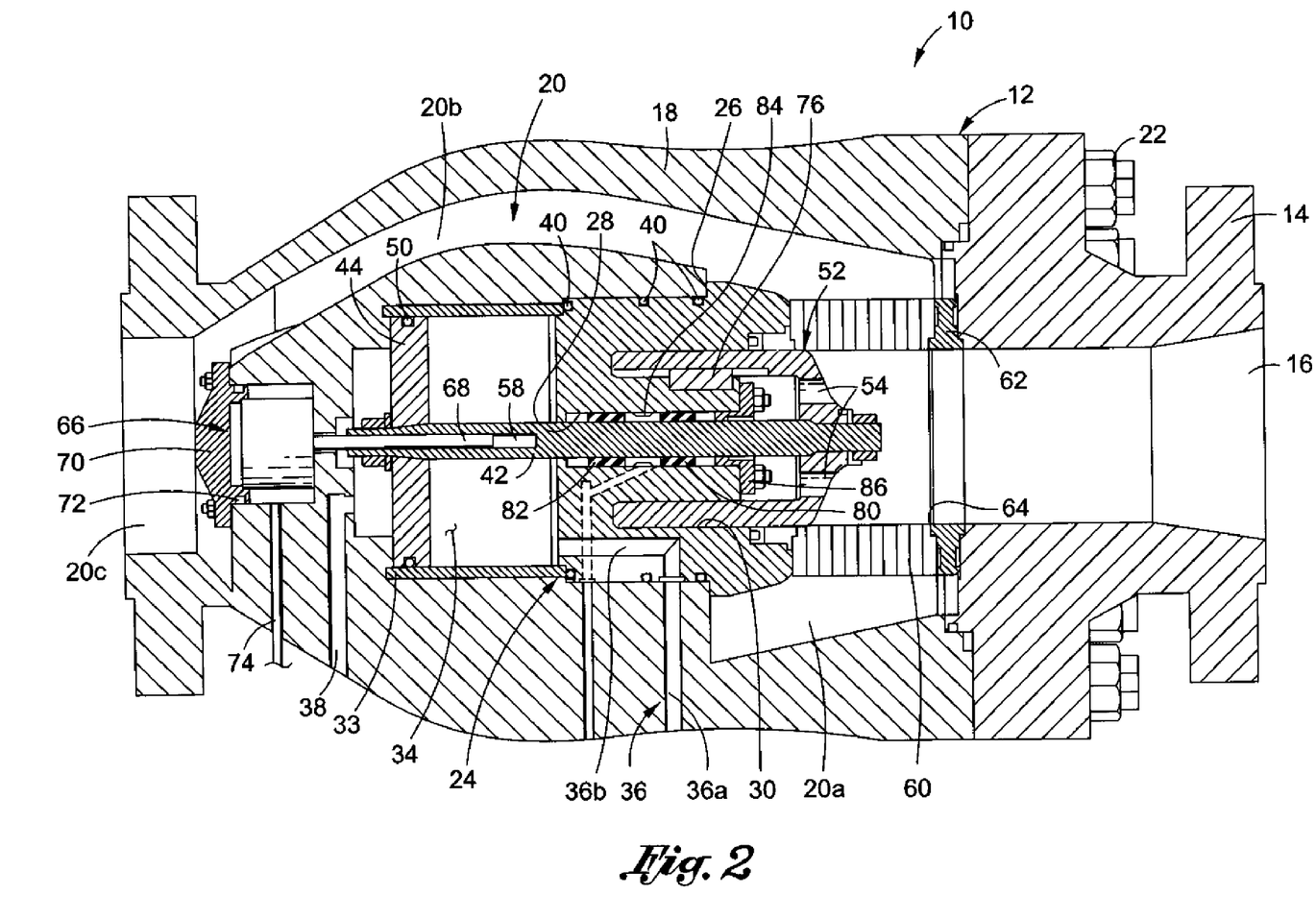
FIG. 2 is a cross-sectional view of the axial drag valve of the first embodiment as residing in its open position.

Referring now to the drawings wherein the showings are for purposes of illustrating preferred embodiments of the present invention only, and not for purposes of limiting the same, FIGS. 1 and 2 depict an axial drag valve 10 constructed in accordance with a first embodiment of the present invention. In FIG. 1, the valve 10 is depicted in a closed position, while in FIG. 2, the valve 10 is depicted in a fully open position.

The valve 10 comprises a housing 12. The housing 12 itself comprises an inlet section 14 which defines an inlet passage 16. In addition to the inlet section 14, the housing 12 includes an outlet section 18 which defines an outlet passage 20. The inlet and outlet sections 14, 18 of the housing 12 are rigidly attached to each other. As seen in FIGS. 1 and 2, the attachment of the inlet and outlet sections 14, 18 to each other is facilitated by the use of fasteners 22, such as bolts. However, those of ordinary skill in the art will recognize that a wide variety of different attachment methods may be used to effectuate the rigid attachment of the inlet and outlet sections 14, 18 to each other. However, in the valve 10, it is contemplated that any attachment method used to facilitate the attachment of the inlet and outlet sections 14, 18 to each other will be adapted to allow for the periodic separation of the inlet section 14 from the outlet section 18 as may be needed to access the interior of the housing 12 to allow for maintenance on other parts and components of the valve 10 which will be described in more detail below.

In the outlet section 18 of the housing 12, the outlet passage 20 defines three separate regions. More particularly, the outlet passage 20 defines an enlarged inlet region 20a which is in direct fluid communication with the inlet passage 16. The inlet region 20a transitions into an arcuate central region 20b, which itself transitions into an enlarged, generally cylindrical outlet region 20c. Those of ordinary skill in the art will recognize that the configuration of the outlet passage 20 as shown in FIGS. 1 and 2 is exemplary only, and that alternative configurations for the outlet passage 20 are contemplated to be within the spirit and scope of the present invention. Indeed, certain exemplary alternative embodiments of the outlet passage 20 will be described below in relation to other embodiments of the valve 10.

Disposed within the interior of the housing 12 and rigidly attached thereto is a hub cap 24. The hub cap 24 defines an annular shoulder 26 which is abutted against an interior portion of the outlet section 18 of the housing 12. That portion of the hub cap 24 extending between the shoulder 26 and the inlet passage 16 resides within the inlet region 20a of the outlet passage 20. In addition to defining the shoulder 26, the hub cap 24 also defines a central bore 28 which extends axially therethrough. Additionally, formed in that end of the hub cap 24 facing the inlet passage 16 is an annular channel 30 which extends to a prescribed depth within the hub cap 24. The bore 28 and channel 30 are sized and configured to accommodate respective portions of an internal actuator of the valve 10, such as a plug assembly 32 (shown in FIGS. 3 and 3A) which will be described in more detail below.

In the valve 10, the end or face of the hub cap 24 facing the outlet region 20c of the outlet passage 20 is abutted against one end or rim of a cylindrical, tubular piston sleeve 33. The opposite end and the outer surface of the piston sleeve 33 are abutted against an interior portion of the outlet section 18 of the housing 12. The end of the hub cap 24 facing the outlet region 20c, the inner surface of the piston sleeve 33, and a portion of the interior of the outlet section 18 collectively define a generally cylindrical, internal piston chamber 34 of the valve 10. The piston chamber 34 is placeable into fluid communication with an external regulating device such as a spool valve via first and second air passages 36, 38 which each fluidly communicate with the piston chamber 34. The first air passage 36 includes a first segment 36a which extends through the outlet section 18, and a second segment 36b which extends through the hub cap 24 in a generally L-shaped configuration. In this regard, one end of the second segment 36b fluidly communicates with the piston chamber 34, with the opposite end thereof fluidly communicating with the first segment 36a. The second air passage 38 extends exclusively through the outlet section 18 of the housing 12. The first and second air passages 36, 38 are adapted to selectively supply air to, or exhaust air from, the piston chamber 34 in a manner which will be described in more detail below.

As is also seen in FIGS. 1 and 2, the hub cap 24 may be provided with one or more annular grooves 40 within the exterior surface thereof. The groove(s) 40 may include a sealing element such as an O-ring disposed therein for purposes of defining a sealed engagement between the hub cap 24 and other parts of the valve 10. For example, as seen in FIGS. 1 and 2, the O-rings within two of the grooves 40 are used to create seals between the outer surface of the hub cap 24 and the interior of the outlet section 18 of the housing 12, with the O-ring within the remaining one of the grooves 40 being used to create a seal between the hub cap 24 and one end of the piston sleeve 33.

Figure 3:
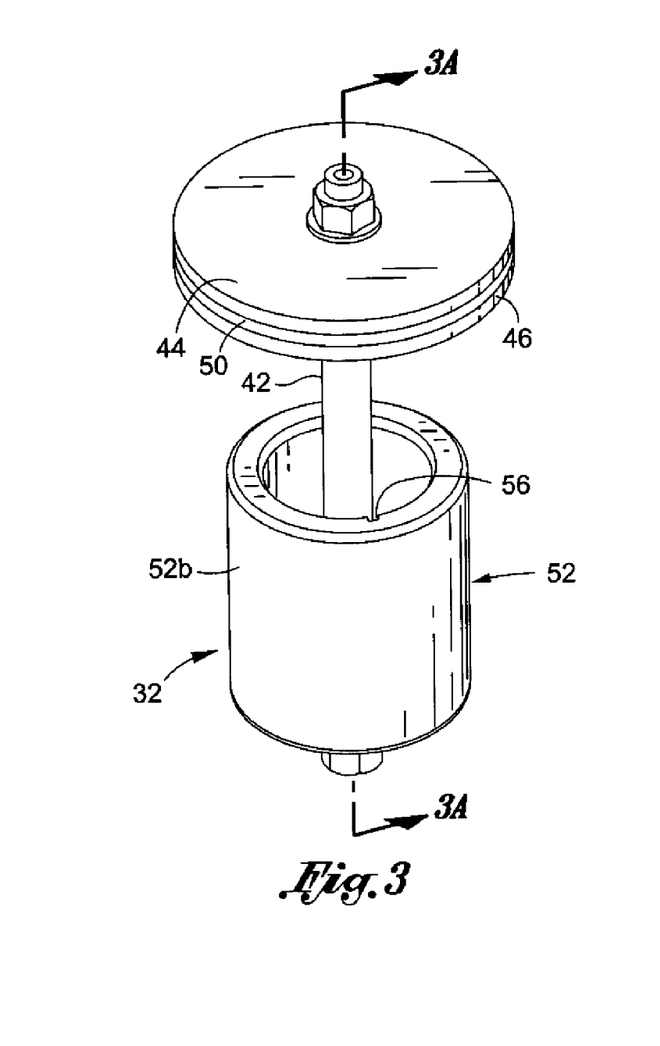
FIG. 3 is a perspective view of the plug assembly of the axial drag valve of the first embodiment shown in FIGS. 1 and 2.
Figure 3A:
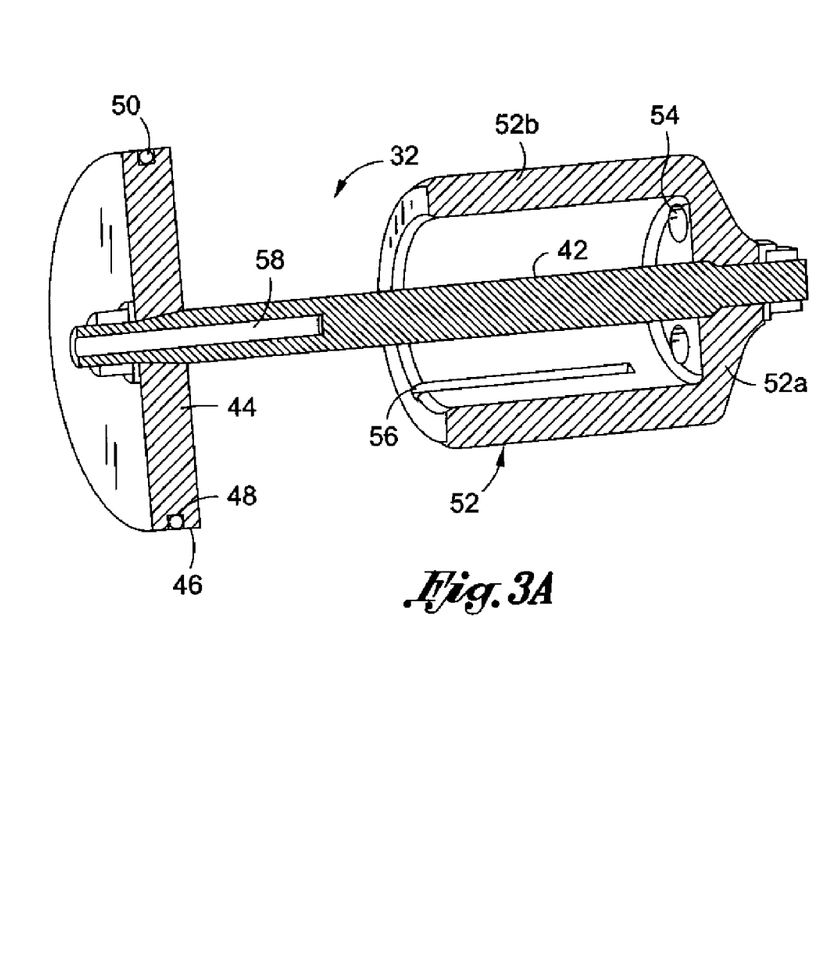
FIG. 3A is a cross-sectional, perspective view of the plug assembly of the axial drag valve of the first embodiment shown in FIGS. 1 and 2 taken along line 3A-3A of FIG. 3.

As indicated above, the bore 28 and channel 30 of the hub cap 24 are sized and configured to accommodate respective portions of a plug assembly 32 of the valve 10. As seen in FIGS. 3 and 3A, the plug assembly 32 comprises an elongate piston rod 42 defining opposed ends. Attached to the piston rod 42 in relative close proximity to one of the opposed ends thereof is a circularly configured piston head 44. The piston head 44 defines a peripheral side surface 46 having a continuous groove 48 disposed therein. Disposed within the groove 48 is a sealing member such as an O-ring 50. Also attached to the piston rod 42 in relative close proximity to the remaining end thereof is a hollow balanced plug 52. The plug 52 defines an end portion 52a which transitions into an annular, generally cylindrical sidewall portion 52b. Disposed in and extending through the end portion 52a between the inner and outer surfaces thereof is at least one, and preferably a plurality of balance holes 54, the use of which will be described in more detail below. Additionally, formed in the inner surface of the sidewall portion 52*b* is an anti-rotation groove 56, the use of which will also be described in more detail below. As best seen in FIG. 3A, the anti-rotation groove 56 extends to the distal rim defined by the sidewall portion 52*b*, and terminates a prescribed distance inwardly from the inner surface of the end portion 52*a*. The groove 56 also extends in generally parallel relation to the axis of the piston rod 42. As also seen in FIG. 3A, extending axially through a portion of the length of the piston rod 42 is an elongate probe bore 58. The probe bore 58 has a generally circular cross-sectional configuration, and extends from that end of the piston rod 42 disposed closest to the piston head 44 to a prescribed depth within the piston rod 42. The use of the probe bore 58 will also be described in more detail below.

In the valve 10, the piston rod 42 of the plug assembly 32 is advanced through and reciprocally moveable axially within the central bore 28 defined by the hub cap 24. Additionally, the interface of the plug assembly 32 to the hub cap 24 is such that the piston head 44 resides and is reciprocally moveable within the piston chamber 34 collectively defined by the outlet section 18, hub cap 24 and the piston sleeve 33. More particularly, the piston head 44 is moveable along the axis defined by the piston sleeve 33 (which is coaxially aligned with the axis of the piston rod 42), with the O-ring 50 being slidably moveable along the inner surface of the piston sleeve 33.

The valve 10 further comprises a generally cylindrical, tubular flow control element 60 which is disposed within the inlet region 20*a* of the outlet passage 20. As seen in FIGS. 1 and 2, one end or annular rim defined by flow control element 60 is abutted against that end or annular rim of the hub cap 24 which faces the inlet passage 16. The opposite, remaining end or annular rim of the flow control element 60 is abutted against an annular sealing member 62 which is itself abutted against an interior surface portion defined by the inlet section 14 of the housing 12. Thus, the sealing member 62 is effectively captured and compressed between the flow control element 60 and the inlet section 14 of the housing 12, with the flow control element 60 itself being captured and compressed between the hub cap 24 and the sealing member 62. The positioning of the hub cap 24, flow control element 60 and sealing member 62 relative to each other is such that the axis of the bore 28, the axis of the flow control element 60, and the axis of the sealing member 62 are all coaxially aligned with each other, and hence the axis of the piston rod 42 which is advanced through and reciprocally moveable within the bore 28 as indicated above. The sealing member 62 defines an annular sealing surface 64 which is disposed slightly radially inward of the inner surface of the flow control element 60. In the valve 10, it is contemplated that the flow control element 60 may comprise a stack of annular discs that collectively define a series of substantially radially directed passageways extending between the inner and outer radial surfaces or edges of the discs. Each of the radially directed passageways has a plurality of turns formed therewithin in order to reduce the velocity of fluid that is flowing through the flow control element 60. An exemplary flow control element 60 is disclosed in commonly owned U.S. Pat. No. 5,687,763, the disclosure of which is incorporated herein by reference.

As previously explained, FIG. 1 depicts the valve 10 in its closed position, with FIG. 2 depicting the valve 10 in its fully open position. As also indicated above, the interface of the plug assembly 32 to the hub cap 34 is such that the piston head 44 resides and is reciprocally moveable within the piston chamber 34. In the valve 10, the plug 52 is likewise reciprocally moveable axially within the interior of the flow control element 60 in a manner effectively facilitating the opening or closure of the valve 10. More particularly, when the valve 10 is in its closed position as shown in FIG. 1, a peripheral portion of the outer surface of the end portion 52*a* of the plug 52 is abutted and effectively sealed against the sealing surface 64 defined by the sealing member 62. When the plug 52 is in this particular orientation, the sidewall portion 52*b* thereof is aligned with but substantially removed from within the complimentary shaped channel 30 within the hub cap 24. At the same time, the piston head 44 is oriented within the piston chamber 34 so as to be disposed proximate the hub cap 24, with only a small gap being defined between the piston head 44 and the end of the hub cap 24 facing the outlet region 20*c* of the outlet passage 20, as shown in FIG. 1. Conversely, when the valve 10 is moved to the fully open position as shown in FIG. 2, the plug 52 is moved axially away from the sealing member 62, with the sidewall portion 52*b* of the plug 52 being drawn into the complimentary channel 30 and the end portion 52*a* of the plug 52 being effectively separated from the sealing surface 64 defined by the sealing member 62. At the same time, the piston head 44 is oriented within the piston chamber 34 so as to reside in close proximity to that end of the piston sleeve 33 opposite that abutted against the hub cap 24.

As will be recognized by those of ordinary skill in the art, the plug assembly 32, and in particular the plug 52 thereof, is effectively moved between closed and fully open positions relative to the sealing member 62 as a result of the reciprocal axial movement of the piston rod 42 of the plug assembly 32 relative to the hub cap 24. Such reciprocal axial movement of the piston rod 42, and hence the plug 52, is facilitated by the selective application of air pressure to either side of the piston head 44 within the piston chamber 34. More particularly, to facilitate the movement of the plug 52 to the closed position shown in FIG. 1, pressurized air is input into the piston chamber 34 via the second air passage 38, such pressurized air acting against the piston head 44 in a manner effectively forcing it toward the hub cap 24, the movement of the piston head 44 toward the hub cap 24 being discontinued as a result of the abutment of the plug 52 against the sealing surface 64 of the sealing member 62. As will be recognized, when the second air passage 38 is pressurized as occurs to facilitate the actuation of the plug 52 to the closed position, the first air passage 36 acts as an exhaust port so that air captured in the piston chamber 34 between the piston head 44 and the hub cap 24 does not impede the movement of the piston head 44 toward the hub cap 24.

Conversely, to facilitate the movement of the plug 52 to the fully open position shown in FIG. 2, the first air passage 36 is pressurized so as to facilitate the input of air into the piston chamber 34 in a manner acting against the piston head 44 as results in its movement away from the hub cap 24 toward the outlet region 20*c* of the outlet passage 20. Such movement of the piston head 44 effectively draws the plug 52 away from the sealing member 62 and into its nested orientation within the hub cap 24 as shown in FIG. 2. As will be recognized, when the first air passage 36 is pressurized to facilitate the movement of the plug 52 toward the fully open position, the second air passage 38 effectively functions as an exhaust port so that any air trapped between the piston head 44 and the outlet section 18 of the housing 12 does not impede the movement of the piston head 44 away from the hub cap 24. Within the piston chamber 34, pressurized air is prevented from migrating between the peripheral edge of the piston head 44 and the inner surface of the piston sleeve 33 by the sliding, sealed engagement effectuated by the above-described O-ring 50.

In the valve configuration shown in FIGS. 1 and 2, fluid normally enters the valve 10 via the inlet passage 16 in the direction designated by the arrow A in FIG. 1. When the plug 52 is in the closed position, the fluid within the inlet passage 16 is effectively prevented from entering the outlet passage 20. When the plug 52 is moved from the closed position shown in FIG. 1 toward the fully open position shown in FIG. 2, the fluid is able to flow through the sealing member 62 and thereafter radially outwardly through the flow control element 60 and into the outlet passage 20. Since the fluid must flow through the flow control element 60 to reach the outlet passage 20, the energy of the fluid is effectively reduced due to the above-described functional attributes of the flow control element 60.

The opening of the valve 10 may be effectuated without necessarily actuating the plug 52 to the fully open position shown in FIG. 2. In this regard, in the valve 10, the axial movement of the plug 52 away from the sealing member 62 may be regulated or controlled depending on the desired level of fluid energy dissipation. Along these lines, as will be recognized, the greater the amount of axial movement of the plug 52 away from the sealing member 62, the greater the number of energy dissipating flow passageways of the flow control element 60 that will be exposed to the incoming fluid flow via the inlet passage 16. In this regard, maximum energy dissipation of the inlet fluid is achieved when the plug 52 is moved to the fully open position shown in FIG. 2.

In order to monitor and thus tightly regulate or control the position of the plug 52 relative to the sealing member 62, the valve 10 is provided with a position feedback device 66 which is oriented between the piston chamber 34 and the outlet region 20c of the outlet passage 20, and is accommodated within a complimentary internal recess defined by the outlet section 18 of the housing 12. The feedback device 66 includes an elongate, generally cylindrical probe portion 68 which is coaxially aligned with and slideably advanced into the probe bore 58 of the piston rod 42. The probe bore 58 and probe portion 68 of the feedback device 66 have complimentary configurations, with the advancement of the probe portion 68 into the probe bore 58 being operative to allow the feedback device 66 to effectively monitor the relative position of the piston rod 42, and hence the plug 52. As is apparent from FIGS. 1 and 2, the piston rod 42 is moveable relative to the probe portion 68 which remains stationary, with at least some segment of the probe portion 68 always remaining within the interior of the probe bore 58 throughout the movement of the plug 52 between the closed and fully open extremes.

In the valve 10, the feedback device 66 is effectively sealed within its complimentary recess defined by the outlet section 18 by a sealing cap 70 which is rigidly attached to the outlet section 18. The sealing cap 70 defines a continuous groove which accommodates a sealing member such as an O-ring 72. The abutment of the O-ring 72 against the outlet section 18 as occurs when the sealing cap 70 is rigidly attached to the outlet section 18 effectively prevents fluid flowing through the outlet passage 20 from reaching and possibly affecting the performance of the feedback device 66. A hard wired connection to the feedback device 66 to facilitate the electrical connection thereof to an external control device may be obtained via a probe outlet passage 74 which extends through the outlet section 18 of the housing 12 and into communication with the internal recess accommodating the feedback device 66. The detachment of the sealing cap 70 from the outlet section 20 provides access to the feedback device 66 as may be needed for the periodic maintenance thereof.

As the plug 52 moves between the fully open and closed positions during operation of the valve 10, it is desirable to effectively prevent any rotation of the plug 52 relative to the hub cap 24. Such anti-rotation is accomplished in the valve 10 by the inclusion of an anti-rotation member 76 which is partially embedded within the hub cap 24, and protrudes into the channel 30 defined thereby. As is most apparent from FIG. 2, the exposed portion of the anti-rotation member 76 has a configuration which is complimentary to the anti-rotation groove 56 included in the inner surface of the sidewall portion 52b of the plug 52. When the plug 52 is in any position other than its closed position, at least a portion of the anti-rotation member 76 is slidably received into the complimentary anti-rotation groove 56, thus effectively preventing any rotation of the plug 52 relative to the hub cap 24.

As indicated above, the plug 52 integrated into the valve 10 is "balanced" as a result of the inclusion of the balance holes 54 within the end portion 52a thereof. As a result of the inclusion of the balance holes 54 therein, when the plug 52 is in its closed position, high pressure fluid flowing through the inlet passage 16 in the direction of the arrow A is able to pass through the balance holes 54 and into the interior chamber 78 collectively defined by the inner surfaces of the end and sidewall portions 52a, 52b of the plug 52, the outer surface of the piston rod 42, and a portion of the hub cap 24. The placement of the plug 52 into a balanced condition as a result of the inclusion of the balance holes 54 therein gives rise to greater ease in the movement of the plug 52 between the fully open and closed positions. Despite fluid flowing into the interior chamber 78 when the plug 52 is in the closed position, such fluid is still effectively prevented from flowing through the flow control element 60 and hence into the outlet passage 20.

As will be recognized by those of ordinary skill in the art, the proper operation of the valve 10 could be compromised if fluid flowing into the interior chamber 78 when the plug 52 is in the closed position is able to migrate between the outer surface of the piston rod 42 and that surface of the hub cap 24 defining the bore 28 into the piston chamber 34. To prevent the flow of fluid from the interior chamber 78 into the piston chamber 34, a live load packing is preferably interposed between the piston rod 42 and the hub cap 24. As seen in FIGS. 1 and 2, the live load packing comprises annular first and second packing elements 80, 82 which reside within the central bore 28 in spaced relation to each other. Captured between the first and second packing elements 80, 82 is an annular lantern ring 84. The piston rod 42 is slidably advanced through the first and second packing elements 80, 82 and the lantern ring 84. The first and second packing elements 80, 82 and the lantern ring 84, as well as ancillary packing elements disposed adjacent respective ones of the first and second packing elements 80, 82, are all maintained in a compressive state by an annular packing bushing 86 which is rigidly attached to the hub cap 24 and partially resides within the interior chamber 78. The piston rod 42 is also slidably advanced axially through the packing bushing 86.

The sealing arrangement provided by the first and second packing elements 80, 82 and intermediate lantern ring 84 is effective in preventing any fluid migration from the interior chamber 78 to the piston chamber 34. However, in the event that such seal degrades over time as a result of the axial movement of the piston rod 42, any fluid reaching the lantern ring 84 from the interior chamber 78 may be effectively bled off by a leak off passage 88 of the valve 10. As seen in FIGS. 1 and 2, the leak off passage 88 includes a first segment 88a which extends through the outlet section 18, and a second segment 88b which extends through the hub cap 24. In this regard, one end of the second segment 88b fluidly communicates with that portion of the bore 28 adjacent the lantern ring 84, with the opposite end thereof fluidly communicating with the first segment 88a.

Figure 4:
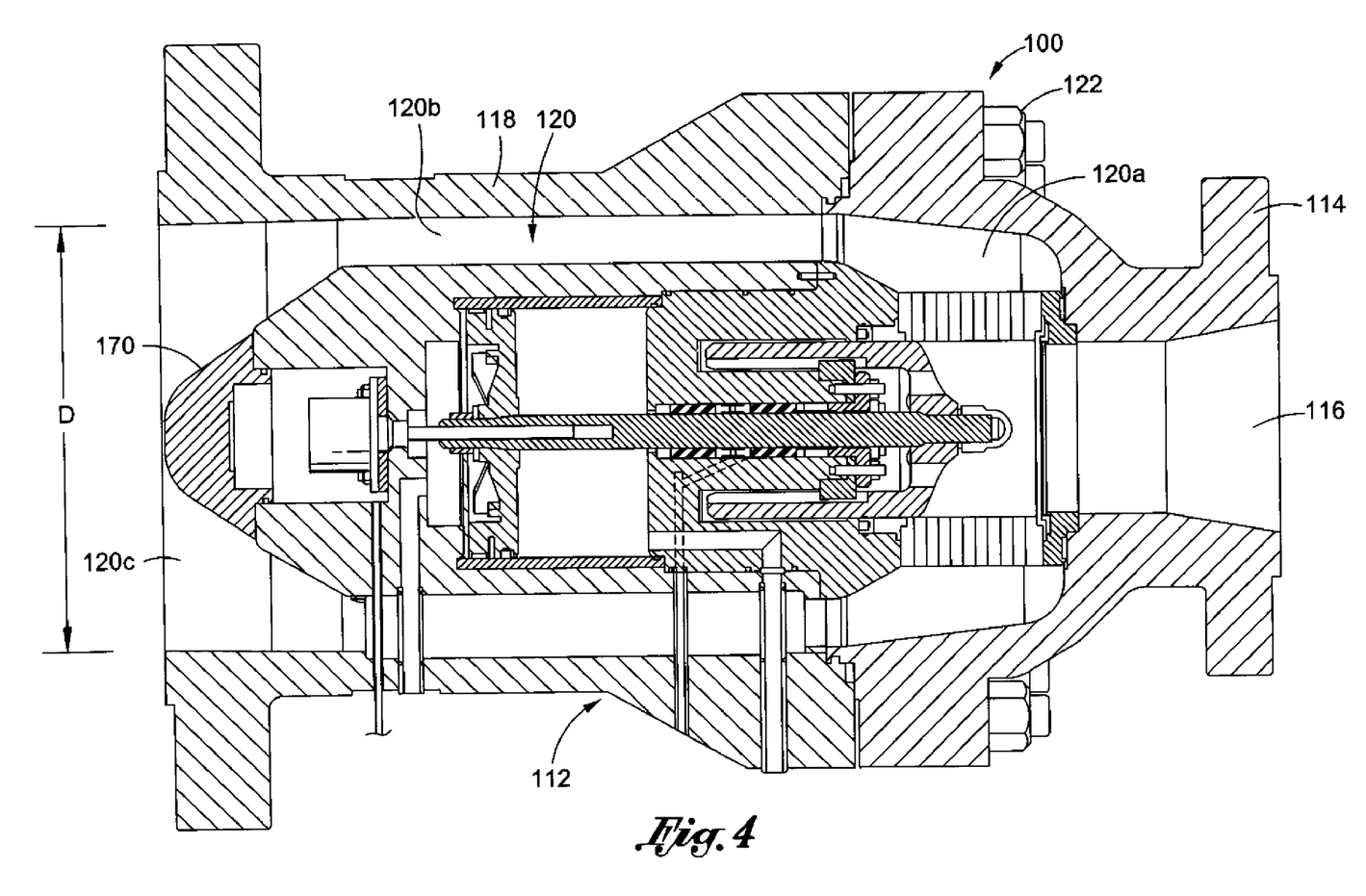
FIG. 4 is a cross-sectional view of an axial drag valve constructed in accordance with a second embodiment of the present invention.

Referring now to FIG. 4, there is shown an axial drag valve 100 constructed in accordance with a second embodiment of the present invention. The axial drag valve 100 is substantially similar in structure and function to the axial drag valve 10 described above. Accordingly, only the distinctions between the valves 10, 100 will be highlighted below.

The primary distinction between the valve 100 and the above-described valve 10 lies in the configuration of the housing 112 of the valve 100 in comparison to the housing 12 of the valve 10. More particularly, the housing 112 of the valve 100 comprises an inlet section 114 and an outlet section 118 which are rigidly attached to each other. As seen in FIG. 4, the attachment of the inlet and outlet sections 114, 118 to each other is facilitated by the use of fasteners 122, such as bolts. In the valve 100, it is contemplated that any attachment method used to facilitate the attachment of the inlet and outlet sections 114, 118 to each other will be adapted to allow for the periodic separation of the inlet section 114 from the outlet section 118 as may be needed to access the interior of the housing 112 to allow for maintenance on other parts and components of the valve 100.

In the valve 100, the inlet section 114 defines an inlet passage 116. Additionally, the inlet and outlet sections 114, 118 collectively define an outlet passage 120. In this regard, an inlet region 120a of the outlet passage 120 is defined by the inlet section 114. The inlet region 120a transitions into a central region 120b, which itself transitions into an enlarged outlet region 120c. The central and outlet regions 120b, 120c are each defined by the outlet section 118 of the housing 112. As further seen in FIG. 4, the outlet region 120c is formed to have a prescribed diameter D, which in many applications may be approximately twelve (12) inches.

A further distinction between the valves 10, 100 lies in the configuration of the sealing cap 170 of the valve 100 in comparison to the sealing cap 70 of the valve 10. In this regard, due to the alternative configuration of the outlet passage 120 in comparison to the outlet passage 20, the sealing cap 170 is formed to have a more cone-like configuration in comparison to the sealing cap 70 of the valve 10. The cone-like configuration of the sealing cap 170 in the valve 100 promotes a smoother transition for fluid flowing from the central region 120b of the outlet passage 120 into the outlet region 120c thereof.

Figure 4A:
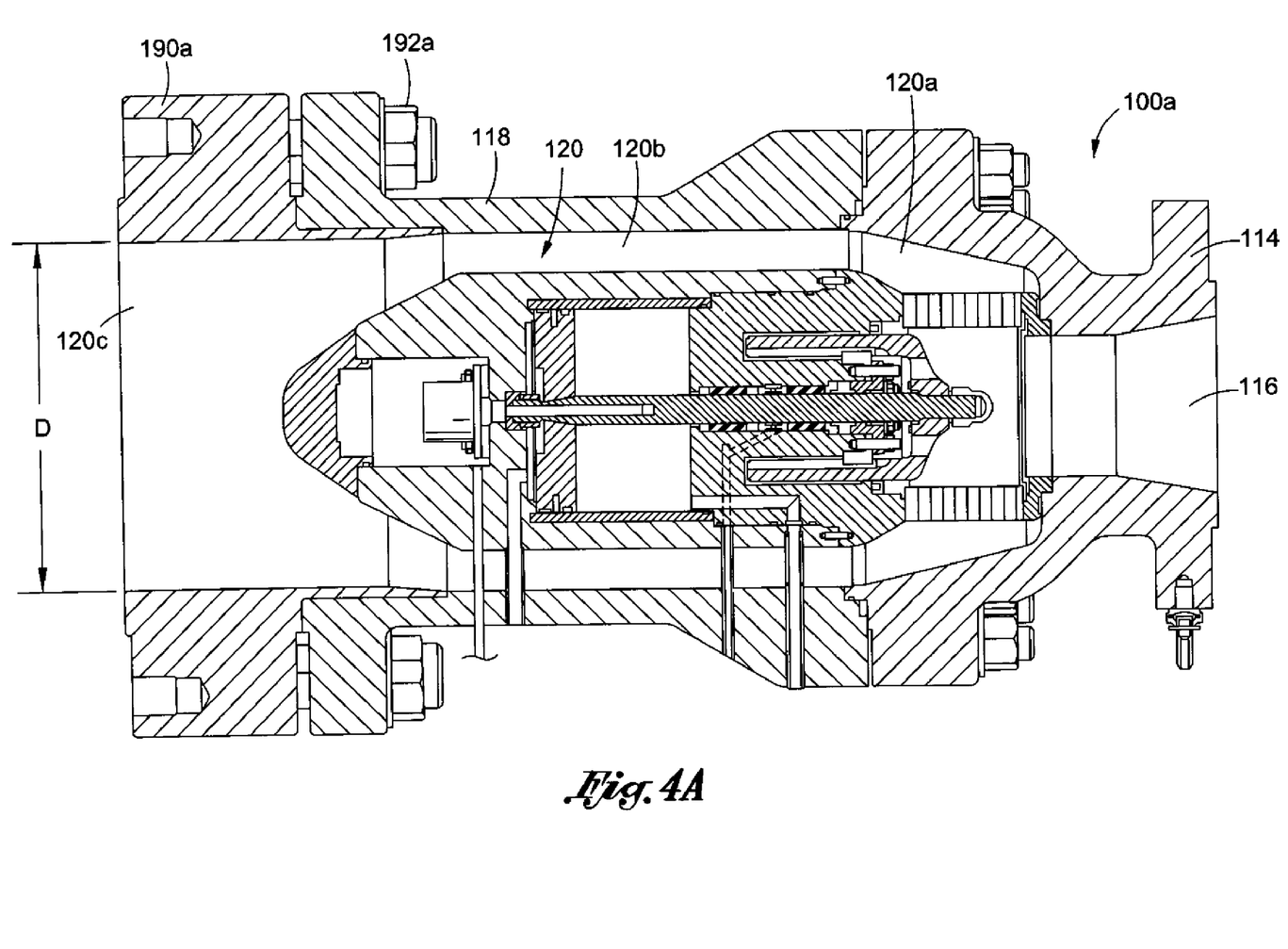
FIG. 4A is a cross-sectional view of a first potential variant of the axial drag valve of the second embodiment shown in FIG. 4.

Referring now to FIG. 4A, there is shown an axial drag valve 100a which comprises a first potential variant of the valve 100 described above in relation to FIG. 4. More particularly, the sole distinction between the valves 100, 100a lies in the outlet region 120c of the outlet passage 120 in the valve 100a being defined by an outlet flange 190a which is rigidly attached to that end of the outlet section 118 opposite the end which is rigidly attached to the inlet section 114. The attachment of the outlet flange 190a to the outlet section 118 in the valve 100a is preferably facilitated by the use of fasteners 192a such as bolts. However, those of ordinary skill in the art will recognize that a wide variety of different attachment methods may be used to effectuate the rigid attachment of the outlet flange 190a to the outlet section 118. However, in the valve 100a, it is contemplated that any attachment method used to facilitate the attachment of the outlet flange 190a to the outlet section 118 will be adapted to allow for the optional detachment of the outlet flange 190a from the outlet section 118 for potential replacement with an alternatively configured outlet flange. In the outlet flange 190a shown in FIG. 4A, the outlet region 120c of the outlet passage 120 defined thereby is of a diameter D which in certain applications may be approximately twelve (12) inches.

Figure 4B:
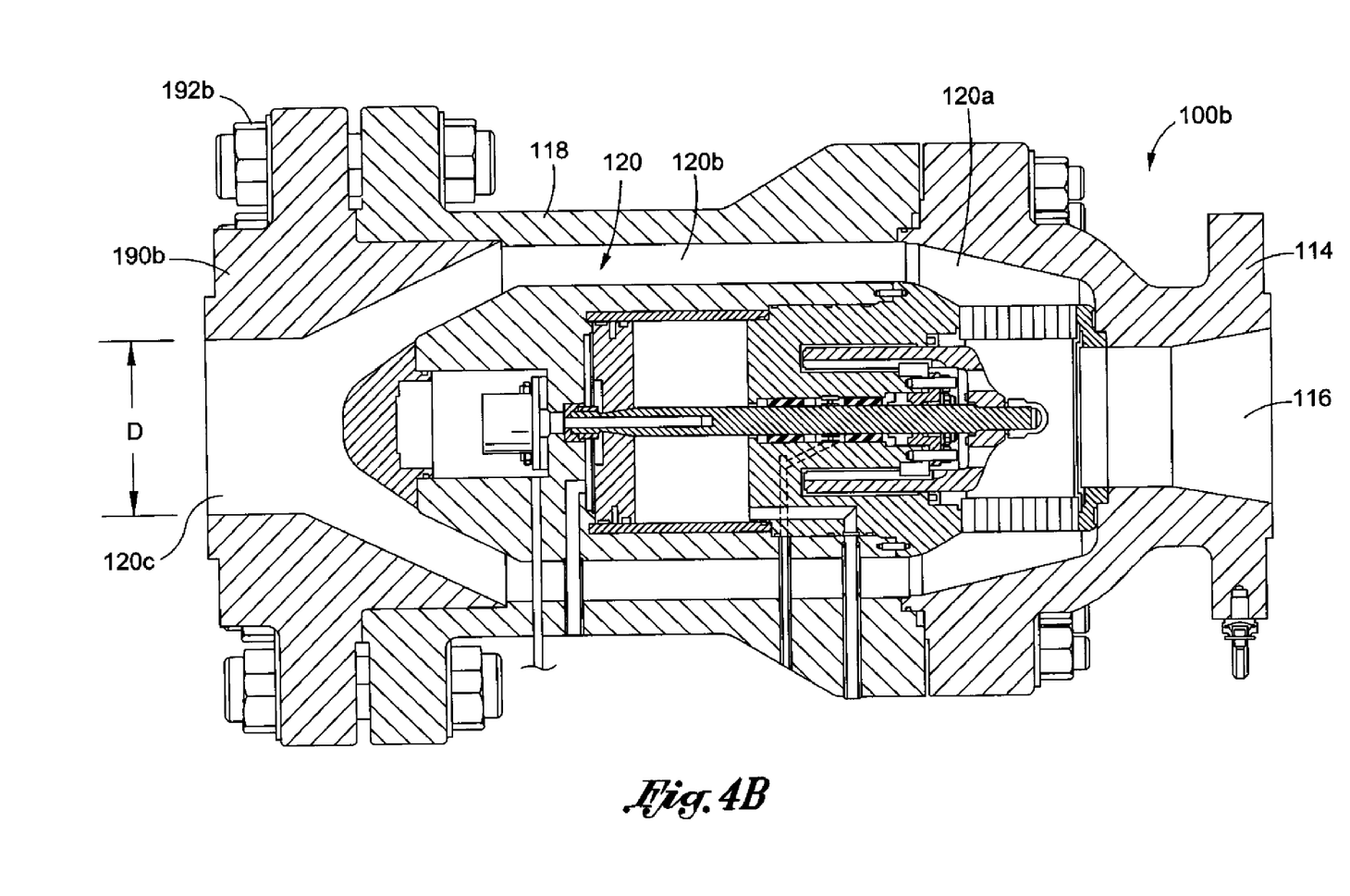
FIG. 4B is a cross-sectional view of a second potential variant of the axial drag valve of the second embodiment shown in FIG. 4.

Referring now to FIG. 4B, there is shown an axial drag valve 100b which comprises a second potential variant of the valve 100 described above in relation to FIG. 4. More particularly, the sole distinction between the valves 100, 100b lies in the outlet region 120c of the outlet passage 120 in the valve 100a being defined by an outlet flange 190b which is rigidly attached to that end of the outlet section 118 opposite the end which is rigidly attached to the inlet section 114. The attachment of the outlet flange 190b to the outlet section 118 in the valve 100a is preferably facilitated by the use of fasteners 192b such as bolts. However, those of ordinary skill in the art will recognize that a wide variety of different attachment methods may be used to effectuate the rigid attachment of the outlet flange 190b to the outlet section 118. However, in the valve 100a, it is contemplated that any attachment method used to facilitate the attachment of the outlet flange 190b to the outlet section 118 will be adapted to allow for the optional detachment of the outlet flange 190b from the outlet section 118 for potential replacement with an alternatively configured outlet flange. In the outlet flange 190b shown in FIG. 4A, the outlet region 120c of the outlet passage 120 defined thereby is effectively reduced to a diameter D which in certain applications may be approximately six (6) inches. Those of ordinary skill in the art will recognize that the outlet flange 190b may be optionally replaced with the outlet flange 190a described above in relation to FIG. 4A.

Figure 5:
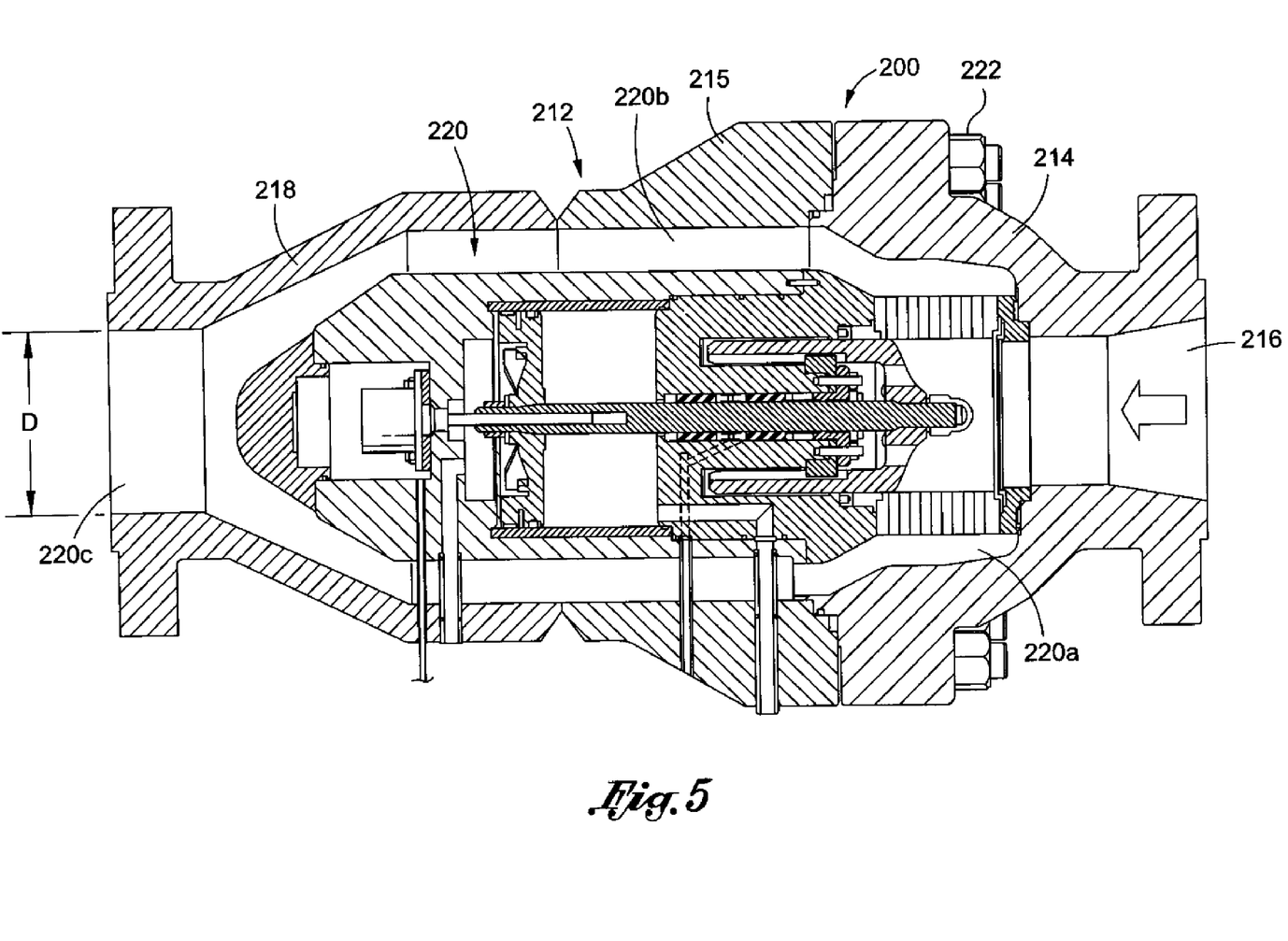
FIG. 5 is a cross-sectional view of an axial drag valve constructed in accordance with a third embodiment of the present invention.

Referring now to FIG. 5, there is shown an axial drag valve 200 constructed in accordance with a third embodiment of the present invention. The axial drag valve 200 is substantially similar in structure and function to the axial drag valve 100 described above. Accordingly, only the distinctions between the valves 100, 200 will be highlighted below.

The primary distinction between the valve 200 and the above-described valve 100 lies in the configuration of the housing 212 of the valve 200 in comparison to the housing 112 of the valve 100. More particularly, the housing 212 of the valve 200 comprises an inlet section 214, and intermediate section 215, and an outlet section 218 which are rigidly attached to each other. As seen in FIG. 5, the attachment of the inlet and intermediate sections 214, 215 to each other is facilitated by the use of fasteners 222, such as bolts. In the valve 200, it is contemplated that any attachment method used to facilitate the attachment of the inlet and intermediate sections 214, 215 to each other will be adapted to allow for the periodic separation of the inlet section 214 from the intermediate section 215 as may be needed to access the interior of the housing 212 to allow for maintenance on other parts and components of the valve 200. As is apparent from FIG. 5, it is contemplated that the outlet section 218 will be rigidly attached to the intermediate section 215 through the use of an attachment means other than the above-described fasteners 222.

In the valve 200, the inlet section 214 defines an inlet passage 216. Additionally, the inlet, intermediate and outlet sections 214, 215, 218 collectively define an outlet passage 220. In this regard, an inlet region 220a of the outlet passage 220 is defined by the inlet section 214. The inlet region 220a transitions into a central region 220b of the outlet passage 220 which is defined by the intermediate section 215. The central region 220b itself transitions into an outlet region 220c of the outlet passage 220 which is defined by the outlet section 218 of the housing 212. As further seen in FIG. 5, the outlet region 220c of the outlet passage 220 is effectively reduced to a diameter D which in many applications may be approximately six (6) inches.

Figure 6:
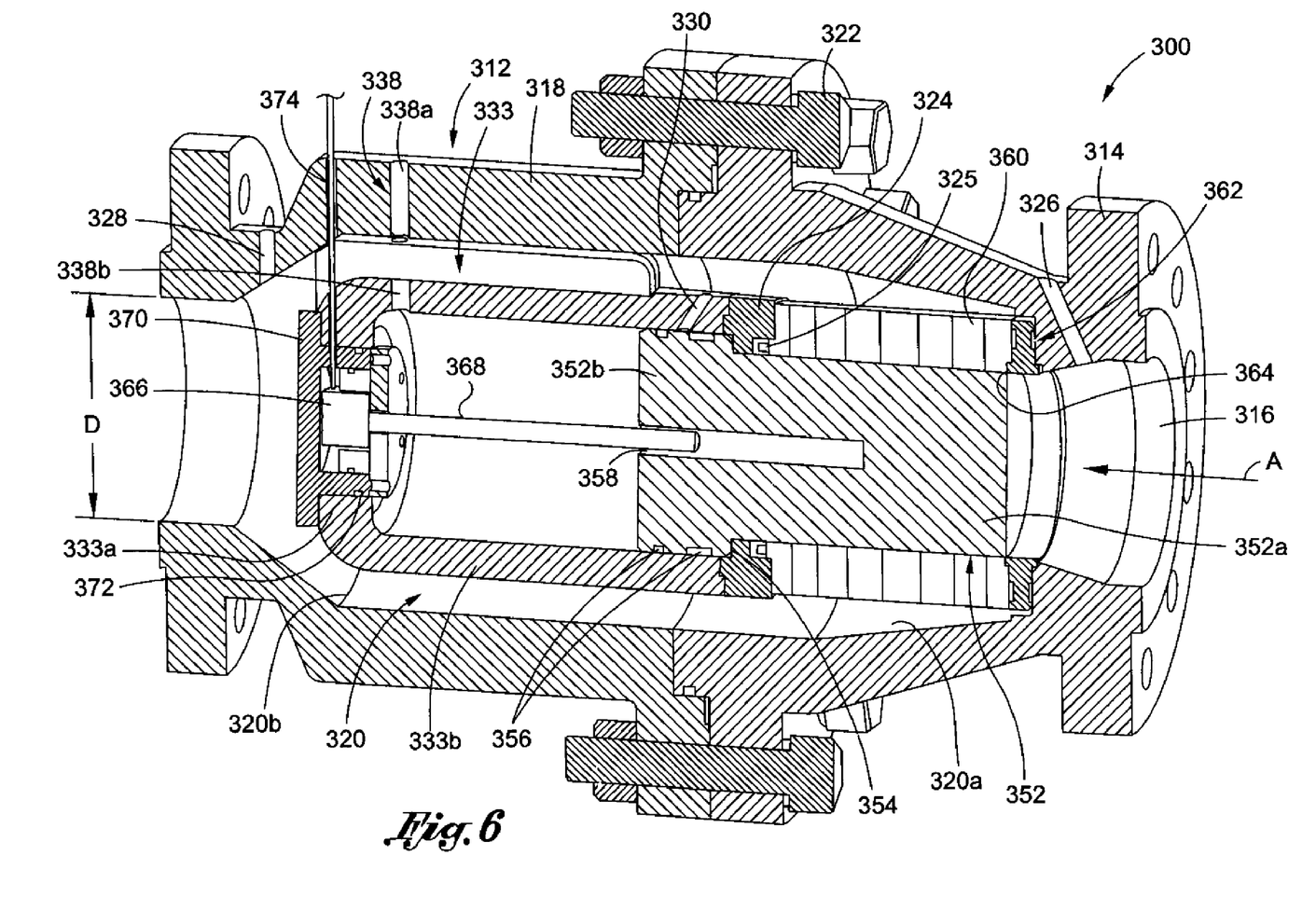
FIG. 6 is a cross-sectional view of an axial drag valve constructed in accordance with a fourth embodiment of the present invention.

Referring now to FIG. 6, there is shown an axial drag valve 300 constructed in accordance with a fourth embodiment of the present invention. The valve 300 comprises a housing 312. The housing 312 itself comprises an inlet section 314 and an outlet section 318 which are rigidly attached to each other. The attachment of the inlet and outlet sections 314, 318 to each other is facilitated through the use of fasteners 322, such as bolts. However, those of ordinary skill in the art will recognize that a wide variety of different attachment methods may be used to effectuate the rigid attachment of the inlet and outlet sections 314, 318 to each other. However, in the valve 300, it is contemplated that any attachment method used to facilitate the attachment of the inlet and outlet sections 314, 318 to each other will be adapted to allow for the periodic separation of the inlet section 314 from the outlet section 318 as may be needed to access the interior of the housing 312 to allow for maintenance on other parts and components of the valve 300 which will be described in more detail below.

The inlet section 314 of the housing 312 defines an inlet passage 316. Additionally, the inlet and outlet sections 314, 318, when rigidly attached to each other, collectively define an outlet passage 320. The outlet passage 320 includes a first region 320a which is defined by the inlet section 314, and a second region 320b which is defined by the outlet section 318. As seen in FIG. 6, the second region 320b of the outlet passage 320 is configured to be effectively reduced to a diameter D which in many applications may be approximately six (6) inches. Those of ordinary skill in the art will recognize that the configuration of the outlet passage 320 as shown in FIG. 6 is exemplary only, and that alternative configurations for the outlet passage 320 are contemplated to be with the spirit and scope of the present invention.

Disposed within the interior of the housing 312 and rigidly attached thereto is a plug sleeve 333. The plug sleeve 333 defines an end portion 333a which transitions into an annular, generally cylindrical side wall portion 333b. Abutted against the distal end or rim defined by the sidewall portion 333b is an annular guide bushing 324. Whereas the plug sleeve 333 resides within both the first and second regions 320a, 320b of the outlet passage 320 (though extending predominantly within the second region 320b), the guide bushing 324 resides exclusively in the first region 320a of the outlet passage 320.

The valve 300 further comprises a generally cylindrical, tubular flow control element 360 which also resides within the first region 320a of the outlet passage 320. As seen in FIG. 6, one end or annular rim defined by the flow control element 360 is abutted against the annular guide bushing 324. The opposite, remaining end or annular rim of the flow control element 360 is abutted against an annular sealing member 362 which is itself abutted against an interior surface portion defined by the inlet section 314 of the housing 312. Thus, the sealing member 362 is effectively captured and compressed between the flow control element 360 and the inlet section 314 of the housing 312, with the flow control element 360 itself being captured and compressed between the guide bushing 324 and the sealing member 362. The positioning of the plug sleeve 333, guide bushing 324, flow control element 360 and sealing member 362 relative to each other is such that the axes thereof are coaxially aligned with each other. The sealing member 362 defines an annular sealing surface 364 which is disposed slightly radially inward of the inner surface of the flow control element 360. In the valve 300, it is contemplated that the flow control element 360 may comprise a stack of annular discs having the structural and functional attributes described above in relation to the flow control element 60 of the valve 10. As further seen in FIG. 6, captured between a portion of the guide bushing 324 and a portion of the rim of the flow control element 360 abutted against the guide bushing 324 is an annular seal 325, the use of which will be discussed in more detail below.

The valve 300 further comprises a plug 352 which is reciprocally moveable axially relative the plug sleeve 333 between a closed position as shown in FIG. 6 and a fully open position. The plug 352 has a generally cylindrical configuration, and defines a first portion 352a which is of a first diameter, and a second portion 352b which is of a second diameter exceeding the first diameter of the first portion 352a. As a result, a continuous, annular shoulder 354 is defined between the outer surfaces of the first and second portions 352a, 352b. Disposed within the peripheral side surface defined by the second portion 352b is a spaced pair of continuous grooves 356. Each of the grooves 356 is adapted to accommodate a sealing element (not shown) such as an O-ring. Extending axially through a portion of the plug 352 is an elongate probe bore 358 which has a generally circular cross-sectional configuration. The probe bore 358 extends from the end or face of the plug 352 defined by the second portion 352b thereof and terminates approximately midway within the first portion 352a, as shown in FIG. 6. The use of the probe bore 358 will be described in more detail below.

As previously explained, FIG. 6 depicts the valve 300 in its closed position. The interface of the plug 352 to the plug sleeve 333 is such that the plug 352 is reciprocally moveable within the interior of the piston sleeve 333, as well as the interior of the flow control element 360, in a manner effectively facilitating the opening or closure of the valve 300. More particularly, when the valve 300 is in its closed position as shown in FIG. 6, a peripheral portion of the outer surface of the first portion 352a of the plug 352 is abutted and effectively sealed against the sealing surface 364 defined by the sealing member 362. At the same time, the second portion 352b is oriented within the plug sleeve 333 such that the shoulder 354 is substantially aligned with the distal end or annular rim defined by the sidewall portion 333b of the plug sleeve 333. Conversely, when the valve 300 is moved to its fully opened position, the plug 352 is moved axially away from the sealing member 362, with the plug 352 being drawn into the interior of the plug sleeve 333 to an orientation wherein only a small portion, if any, of the plug 352 protrudes into the interior of the flow control element 360.

As will be recognized by those of ordinary skill in the art, the plug 352 is effectively moved between closed and fully open positions relative to the sealing member 362 as a result of the reciprocal axial movement of the plug 352 relative to the plug sleeve 333 and flow control element 360. Such reciprocal axial movement of the plug 352 is facilitated by the selective application of air pressure to the end or face of the plug 352 defined by the enlarged second portion 352b thereof. More particularly, to facilitate the movement of the plug 352 to the closed position shown in FIG. 6, an operating fluid such as pressurized air is input into the interior of the plug sleeve 333 via an air passage 338. The air passage 338 includes a first segment 338a which extends through the outlet section 318 of the housing 312, and a second segment 338b which extends through the plug sleeve 333. More particularly, one end of the second segment 338b fluidly communicates with the first segment 338a, with the opposed, remaining end of the second segment 338b extending to the inner surface of the sidewall portion 333b of the plug sleeve 333, thus fluidly communicating with the hollow interior of the plug sleeve 333. Such pressurized air or other operating fluid acts against the plug 352 in a manner effectively forcing it toward the sealing member 362. In this regard, the axial movement of the plug 352 is discontinued as a result of the abutment of the plug 352 against the sealing surface 364 of the sealing member 362.

Conversely, to facilitate the movement of the plug 352 to the fully open position, the air passage 338 is converted to an exhaust port. In this regard, high pressure fluid entering the inlet passage 316 in the direction designated by the arrow A in FIG. 6 acts against the plug 352, and in particular the distal end or face defined by the first portion 352a thereof, in a manner effectively forcing the plug 352 toward the end portion 333a of the plug sleeve 333. Since the air passage 338 effectively functions as an exhaust port, any air or other operating fluid trapped between the plug 352 and the end portion 333a of the plug sleeve 333 does not impede the movement of the plug 352 away from the sealing member 362. As such movement occurs, high pressure fluid entering the valve 300 via the inlet passage 316 in the direction of the arrow A is effectively prevented from migrating beyond the guide bushing 324 by the sliding seal created between the seal 325 and the outer surface of the first portion 352a of the plug 352. To the extent that any high pressure fluid migrates between the seal 325 and the plug 352, such fluid is still effectively prevented from migrating between the peripheral edge of the second portion 352b and the inner surface of the sidewall portion 333b of the plug sleeve 333 by the sliding, sealed engagement effectuated by the O-rings disposed within the grooves 356 within the second portion 352b of the plug 352.

In the valve configuration shown in FIG. 6, when the plug 352 is in the closed position, the fluid within the inlet passage 316 is effectively prevented from entering the outlet passage 320. When the plug 352 is moved from the closed position shown in FIG. 6 toward the fully open position, the fluid is able to flow through the sealing member 362 and thereafter radially outwardly through the flow control element 360 and into the outlet passage 320. Since the fluid must flow through the flow control element 360 to reach the outlet passage 320, the energy of the fluid is effectively reduced due to the above-described functional attributes of the flow control element 360.

The opening of the valve 300 may be effectuated without necessarily actuating the plug 352 to the fully opened position. In this regard, in the valve 300, the axial movement of the plug 352 away from the sealing member 362 may be regulated or controlled depending on the desired level of fluid energy dissipation. Along these lines, as will be recognized, the greater the amount of axial movement of the plug 352 away from the sealing member 362, the greater the number of energy dissipating flow passageways of the flow control element 360 that will be exposed to the incoming fluid flow via the inlet passage 316. In this regard, maximum energy dissipation of the inlet fluid is achieved when the plug 352 is moved to the fully opened position. The degree to which the plug 352 is moved away from the closed position may be controlled by regulating the manner in which air is exhausted from between the plug 352 and the plug sleeve 333 via the air passage 338.

In order to monitor and thus regulate or control the position of the plug 352 relative to the sealing member 362, the valve 300 is provided with a position feedback device 366 which is accommodated within a complimentary recess defined by the end portion 333a of the plug sleeve 333. The feedback device 366 includes an elongate, generally cylindrical probe portion 368 which is coaxially aligned with and slidably advanced into the probe bore 358 of the plug 352. The probe bore 358 and probe portion 366 have complimentary configurations, with the advancement of the probe portion 368 into the probe bore 358 being operative to allow the feedback device 366 to effectively monitor the relative position of the plug 352. The plug 352 is moveable relative to the probe portion 368 which remains stationary, with at least some segment of the probe portion 368 always remaining within the interior of the probe bore 358 throughout the movement of the plug 352 between the closed and fully open extremes.

In the valve 300, the feedback device 366 is effectively sealed within its complimentary recess defined by the plug sleeve 333 by a sealing cap 370 which is rigidly attached to the end portion 333a of the plug sleeve 333. The sealing cap 370 defines a continuous groove 372 which accommodates a sealing member such as an O-ring. The abutment of the O-ring against the plug sleeve 333 effectively prevents fluid flowing through the outlet passage 320 from reaching and possibly affecting the performance of the feedback device 366. A hard wired connection to the feedback device 366 to facilitate the electrical connection thereof to an external control device may be obtained via a probe outlet passage 374 which extends through the outlet section 318 of the housing 312, through the end portion 333a of the plug sleeve 333, and through the sealing cap 370, as shown in FIG. 6. The detachment of the sealing cap 370 from the plug sleeve 333 provides access to the feedback device 366 as may be needed for the periodic maintenance thereof.

As indicated above, as the plug 352 moves between the closed and fully open positions during operation of the valve 300, high pressure fluid entering the valve 300 via the inlet passage 316 in the direction of the arrow A is effectively prevented from migrating beyond the guide bushing 324 by the sliding seal created between the seal 325 and the outer surface of the first portion 352a of the plug 352. To the extent that any high pressure fluid migrates between the seal 325 and the plug 352, such fluid is still effectively prevented from entering into any open area defined between the plug 352 and the end portion 333a of the piston sleeve 333 by the O-rings disposed within the grooves 356.

As is further seen in FIG. 6, the inlet section 314 of the housing 312 preferably includes a fluid passage 326 formed therein and communicating with the inlet passage 316. The fluid passage 326 allows for the effective monitoring of the inlet pressure of the high pressure fluid entering the valve 300 via the inlet passage 316. Similarly, the outlet section 318 of the housing 312 preferably includes a fluid passage 328 which is formed therein and fluidly communicates with the outlet passage 320. Similar to the functionality of the fluid passage 326, the fluid passage 328 allows for the monitoring of the fluid pressure of the fluid flowing through the outlet passage 320 and out of the valve 300. Further, the sidewall portion 333b of the plug sleeve 333 is preferably formed to include a fluid passage 330, one end of which fluidly communicates with the outlet passage 320. The fluid passage 330 is used to communicate the pressure of the fluid flowing into the outlet passage 320 into a space or region which is defined between the shoulder 354 and the guide bushing 324 when the plug 352 is actuated out of its closed position.

The valve 10 discussed above and constructed in accordance with the present invention may be packless or sealess to atmosphere, thus avoiding potential risks related to outside leaks. Leak susceptibility is also reduced as a result of the feedback device 66 being internally located within the valve 10, thus facilitating the full closure of all the internal movements of the valve 10. The valve 10 also provides the additional benefit of optimizing the process pressure ratio factor which refers to the situation in which the valve 10 is fully open to allow for the maximum flow rate at a minimum pressure drop as required by most new processes for energy saving to maximize differential pressure across the valve 10 when the valve 10 is going to close. In this regard, the valve 10 can reach the highest value of [ΔP min. at max. flow/ΔP max. when going to close], thereby resulting in the aforementioned energy savings. Further benefits include keeping the center of gravity within the pipeline center to provide additional safety when the valve 10 is used in a seismically active environment, and optimizing the flow control element 60 by adding the inherent outlet area expansion, which is particularly important for large mass-flow and high pressure drop or compressible fluids such as gas or vapor.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A valve, comprising:
    a housing defining an inlet passage and an outlet passage; and
    a plug assembly disposed within the housing and comprising:
        a hub cap disposed within the housing and defining an annular channel, the hub cap and housing each having surfaces which directly define at least portions of an internal piston chamber;
        a plug reciprocally moveable between a closed position whereat the plug is operative to prevent the flow of fluid from the inlet passage to the outlet passage, and an open position whereat fluid is able to flow from the inlet passage into the outlet passage, the plug being at least partially received within the annular channel when the plug is in the open position; and
        a piston head disposed within the internal piston chamber and cooperatively engaged to the plug such that the selective application of fluid pressure to the piston head is operative to facilitate the movement of the plug between the closed and open positions;
    wherein the housing defines first and second passages which are each operative to deliver fluid pressure to the piston head for facilitating movement of the plug the first and second passages being formed within the housing so as not to traverse the flow path.

2. The valve of claim 1 wherein the piston head and the plug are attached to a common piston rod which facilitates the operative connection of the piston head to the plug.

3. The valve of claim 2 further comprising a feedback device disposed within the housing and operative to monitor the relative position of the plug.

4. The valve of claim 3 wherein:
    the piston rod includes a probe bore which extends axially therein; and
    the feedback device includes a probe portion which is advanced into the probe bore;
    at least a portion of the probe portion remaining within the probe bore during movement of the plug between the closed and open positions.

5. The valve of claim 2 wherein the hub cap defines a central bore, the piston rod being advanced through and reciprocally moveable axially within the central bore.

6. The valve of claim 5 wherein the plug comprises:
    an end portion having at least one balance hole disposed therein; and
    an annular sidewall portion integrally connected to the end portion.

7. The valve of claim 6 wherein the annular channel is sized and configured to accommodate the sidewall portion of the plug when the plug is moved to the open position.

8. The valve of claim 7 wherein:
    the hub cap includes an anti-rotation member embedded therein which protrudes into the channel; and
    the sidewall portion of the plug defines an inner surface including an anti-rotation groove extending partially therealong;
    the anti-rotation device being slidably advanceable into the anti-rotation groove when the plug is moved out of the closed position to prevent rotation of the plug relative to the hub cap.

9. The valve of claim 5 wherein the plug assembly further comprises a piston sleeve which at least partially defines the piston chamber, the piston head being reciprocally moveable axially within the piston chamber.

10. The valve of claim 9 further comprising a seal assembly disposed within the central bore of the hub cap and circumventing the piston rod to prevent fluid flow from the inlet passage to the piston chamber.

11. The valve of claim 10 wherein the seal assembly comprises:
    a first packing element;
    a second packing element disposed in spaced relation to the first packing element; and
    a lantern ring disposed between the first and second packing elements.

12. The valve of claim 11 further comprising a leak off passage extending through the housing and the hub cap into fluid communication with the central bore proximate the lantern ring of the seal assembly.

13. The valve of claim 1 further comprising a flow control element disposed within the housing between the inlet and outlet passages, the flow control element defining a plurality of passageways, the plug being operative to prevent the flow of fluid from the inlet passage to the flow control element when in the closed position, with fluid being able to flow from the inlet passage, through at least a portion of the flow control element, and into the outlet passage when the plug is in the open position.

14. A valve, comprising:
    a housing defining an inlet passage and an outlet passage and a flow path extending therebetween; and
    a plug assembly disposed within the housing and comprising:
        a hub cap defining a central bore and an annular channel,
        a piston rod advanced through and reciprocally moveable axially within the central bore;
        a plug attached to the piston rod and reciprocally moveable between a closed position whereat the plug is operative to prevent the flow of fluid from the inlet passage to the outlet passage, and an open position whereat fluid is able to flow from the inlet passage into the outlet passage, the plug being at least partially received within the annular channel when the plug is in the open position; and
        a piston head attached to the piston rod and configured such that the selective application of fluid pressure to the piston head is operative to facilitate the movement of the plug between the closed and open positions;
    wherein the housing defines first and second passages which are each operative to deliver fluid pressure to the piston head for facilitating movement of the plug, the first and second passages being formed within the housing so as not to traverse the flow path.

15. The valve of claim 14 further comprising a feedback device disposed within the housing and operative to monitor the relative position of the plug.

16. The valve of claim 15 wherein:
the piston rod includes a probe bore which extends axially therein; and
the feedback device includes a probe portion which is advanced into the probe bore;
at least a portion of the probe portion remaining within the probe bore during movement of the plug between the closed and open positions.

17. The valve of claim 14 further comprising a seal assembly disposed within the central bore of the hub cap and circumventing the piston rod to prevent fluid flow from the inlet passage to the piston head.

18. The valve of claim 17 further comprising a leak off passage extending through the housing and the hub cap into fluid communication with the central bore proximate a portion of the seal assembly.

19. The valve of claim 14 wherein the plug comprises:
an end portion having at least one balance hole disposed therein; and
an annular sidewall portion integrally connected to the end portion.

20. The valve of claim 19 wherein:
the annular channel is sized and configured to accommodate the sidewall portion of the plug when the plug is moved to the open position, and an anti-rotation member embedded therein which protrudes into the channel; and
the sidewall portion of the plug defines an inner surface including an anti-rotation groove extending partially therealong;
the anti-rotation device being slidably advanceable into the anti-rotation groove when the plug is moved out of the closed position to prevent rotation of the plug relative to the hub cap.

21. A valve, comprising:
a housing defining an inlet passage and an outlet passage and a flow path extending therebetween;
a flow control element disposed within the housing between the inlet and outlet passages, the flow control element defining a plurality of passageways; and
a plug assembly disposed within the housing and comprising:
a hub cap disposed within the housing and defining an annular channel, the hub cap and housing each having surfaces which directly define at least portions of an internal piston chamber;
a plug sleeve; and
a plug reciprocally moveable axially within the plug sleeve between a closed position whereat the plug is operative to prevent the flow of fluid from the inlet passage to the flow control element, and an open position whereat fluid is able to flow from the inlet passage, through at least a portion of the flow control element, and into the outlet passage, the plug being at least partially received within the annular channel when the plug is in the open position;
wherein the housing defines first and second passages which are each operative to deliver fluid pressure to the plug for facilitating movement of the plug, the first and second passages being formed within the housing so as not to traverse the flow path.

\* \* \* \* \*